US005601523A

United States Patent [19]

Knelson

[11] Patent Number: 5,601,523

[45] Date of Patent: Feb. 11, 1997

[54] METHOD OF SEPARATING INTERMIXED MATERIALS OF DIFFERENT SPECIFIC GRAVITY WITH SUBSTANTIALLY INTERMIXED DISCHARGE OF FINES

[76] Inventor: Benjamin V. Knelson, 20321-86th Avenue, Langley, British Columbia, Canada, V3A 6Y3

[21] Appl. No.: 502,019

[22] Filed: Jul. 13, 1995

[51] Int. Cl.$^6$ ............................ B01D 43/00; B04B 11/00

[52] U.S. Cl. ............................ 494/29; 494/35; 494/37; 494/56; 494/80

[58] Field of Search ............................ 494/2, 27-30, 494/35, 37, 43, 56, 63, 65, 80; 210/380.1, 781

[56] References Cited

U.S. PATENT DOCUMENTS

| | | | |
|---|---|---|---|
| 957,478 | 5/1910 | Simpson | 494/56 |
| 1,283,846 | 11/1918 | Mark et al. . | |
| 1,473,421 | 11/1923 | Eccleston . | |
| 1,557,672 | 10/1925 | Doerner . | |
| 1,594,501 | 8/1926 | Eccleston . | |
| 1,718,547 | 6/1929 | Eccleston | 494/29 |
| 1,882,389 | 10/1932 | MacIsaac . | |
| 2,112,099 | 3/1938 | Ballou et al. | 494/67 |
| 2,132,195 | 10/1938 | Stirn | 494/80 |
| 2,286,355 | 6/1942 | Fitzsimmons . | |
| 2,688,437 | 9/1954 | Monnet . | |
| 2,723,799 | 11/1955 | Sharples . | |
| 3,152,074 | 10/1964 | Fontein et al. . | |
| 3,623,657 | 11/1971 | Trump | 494/35 X |
| 3,797,736 | 3/1974 | Günnewig . | |
| 3,823,869 | 7/1974 | Loison | 494/56 |
| 3,856,483 | 12/1974 | Rumpf et al. | 494/35 X |
| 4,432,748 | 2/1984 | Novoselac et al. . | |
| 4,608,040 | 8/1986 | Knelson | 494/27 |
| 4,824,431 | 4/1989 | McAlister . | |
| 4,846,781 | 7/1989 | Knelson | 494/27 |
| 4,981,219 | 1/1991 | Burnell et al. | 494/27 X |
| 5,338,284 | 8/1994 | Knelson . | |
| 5,368,541 | 11/1994 | Knelson | 494/37 |

FOREIGN PATENT DOCUMENTS

| | | | |
|---|---|---|---|
| 22055/35 | 4/1936 | Australia | 494/27 |
| 2180589 | 11/1973 | France . | |
| 2133722 | 8/1984 | United Kingdom | 494/56 |
| WO93/13864 | 7/1993 | WIPO . | |

*Primary Examiner*—Charles E. Cooley
*Attorney, Agent, or Firm*—Adrian D. Battison; Murray E. Thrift

[57] ABSTRACT

A centrifuge bowl is used for separating particulate materials of different specific gravity and has a first generally frusto-conical portion of the peripheral wall of the bowl over which the materials are caused to flow, and two axially spaced annular recesses downstream of the first portion and prior to an open mouth of the bowl. The feed materials pass over the peripheral wall causing heavier material to collect within the recesses and the lighter material to discharge through the open mouth. Each recess has a series of angularly spaced discharge ports controlled by pulsed valves. In front of each discharge port is provided a spherical body which directs the material to all sides around the body as it moves towards the discharge port in a generally conical shape. The conical shapes of adjacent discharge ports overlap to provide full discharge of all the material. The first recess acts as a main concentrate collector. The second recess is a secondary collector for materials missed by the first recess so that the material from the second recess is returned to the feed for a further separation.

20 Claims, 7 Drawing Sheets

METHOD OF SEPARATING INTERMIXED MATERIALS OF DIFFERENT SPECIFIC GRAVITY WITH SUBSTANTIALLY INTERMIXED DISCHARGE OF FINES

BACKGROUND OF THE INVENTION

This invention relates to an apparatus and method for separating intermixed materials of different specific gravity and in particular an arrangement employing a rotating bowl having discharge ports in the bowl allowing heavier materials collecting in the bowl to discharge outwardly of the bowl under centrifugal action for collection.

One example of an arrangement of this type is shown in U.S. Pat. No. 5,338,284 of the present inventor which discloses a centrifuge bowl having a peripheral wall with the bowl being rotated about a longitudinal axis so that the peripheral wall rotates about the axis and causes centrifugal force at the peripheral wall to effect separation of materials passing over the peripheral wall. The arrangement provides a plurality of axially arranged collection areas each of which has a plurality of angularly spaced discharge ports so that the materials collecting in the collection areas are discharged outwardly from the bowl for collection. Pinch valves control the discharge.

Another arrangement is shown in International application WO93/13864 by McAlister.

SUMMARY OF THE INVENTION

It is one object of the present invention to provide improvements in the above arrangement of the present inventor to enable an enhancement of the efficiency of separation.

The invention therefore provides a centrifugal separator for separating particulate materials of different specific gravity having a bowl with a peripheral wall. At two axially spaced positions on the peripheral wall are defined collection areas for collecting heavier particulate materials flowing over the peripheral wall. Each collection area includes a radially extending recess of a peripheral wall into which the heavier material collects. The heavier material is discharged outwardly of the peripheral wall under centrifugal forces.

In one aspect, the material is discharged through a series of angularly spaced discharge ports with each port forming a discharge cone of material with an apex at the discharge port and a base of the cone lying on an inner surface of the material at the peripheral wall of the bowl inwardly of the recess. The spacing and arrangement of the walls of the recess are such that the cones naturally form a shape in which the bases of the cones overlap at the inner surface of the material.

In a further aspect each discharge port has a guide body located spaced radially inwardly from the discharge port and outwardly of the inner surface of the materials where the separation is taking place, which guide body is shaped so that the material passes around two axially spaced sides of the guide body and also around two angularly spaced sides of the guide body as the material passes from the inner surface toward the discharge port.

In a further aspect, the material discharging from the second or downstream recess is guided back to the feed so as to return possible fines into the bowl for further re-separation.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
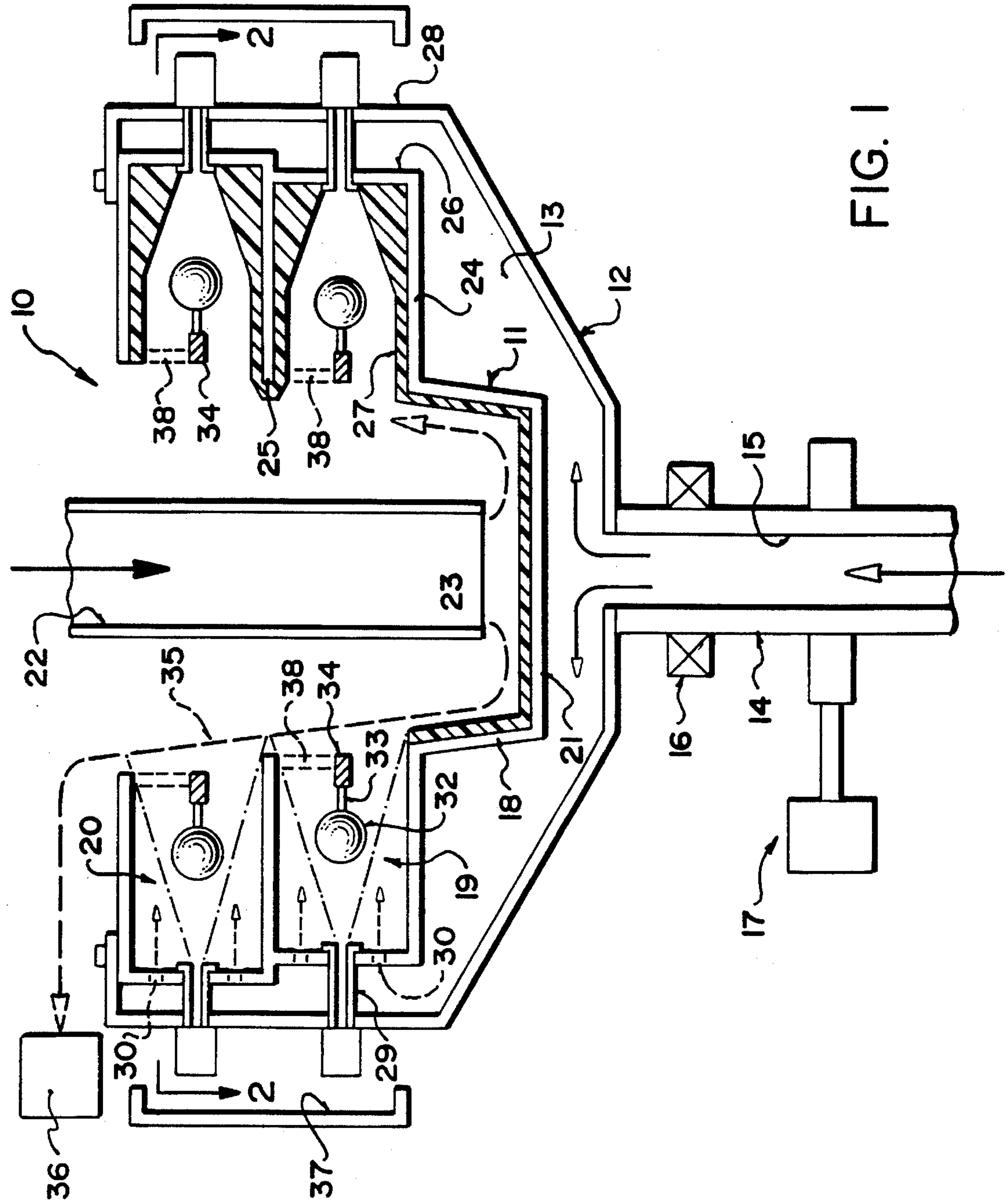
FIG. 1 is a vertical cross sectional view showing schematically a first embodiment of centrifugal separator according to the present invention.
Figure 2:
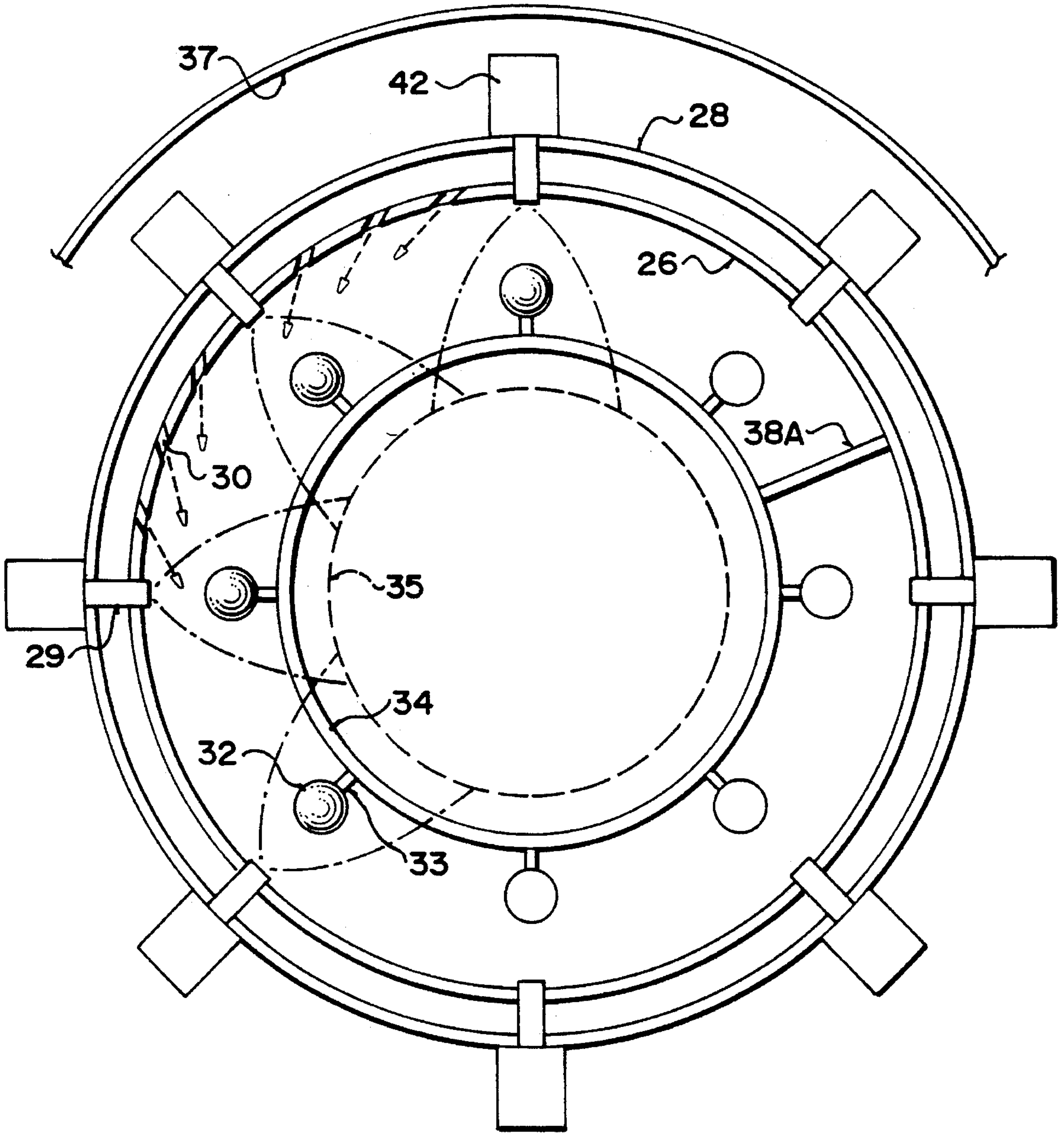
FIG. 2 is a cross sectional view along the lines 2—2 of FIG. 1.

The embodiment shown in FIGS. 1 and 2 is modified relative to the above mentioned U.S. Pat. No. 5,338,284 of the present inventor which shows a centrifugal separator having a plurality of rings defining therebetween recesses with each recess having a plurality of angularly spaced discharge nozzles. Each discharge nozzle is controlled by a pinch valve. The material discharged from the pinch valves is collected.

The arrangement of the present invention as shown in FIGS. 1 and 2 is a modification of the above construction and reference should be made to the above patent for further details of the elements shown schematically in the drawings herein.

In FIGS. 1 and 2, therefore, the apparatus comprises a centrifuge bowl generally indicated at 10 including an inner bowl wall 11 and an outer housing 12 defining therebetween a space 13 for fluidization water supplied through a hollow drive shaft 14 in a duct 15 within the shaft. The drive shaft is connected to the bowl for co-rotation of the inner bowl and the outer housing with the shaft. The shaft is mounted on bearings 16 and is driven by a drive system generally indicated at 17.

The inner bowl is shaped to define a frusto conical base portion 18, a first annular recess 19 and a second annular recess 20. This shape is therefore modified relative to the previous arrangement in that there are only two recesses and the base portion includes the frustoconical wall extending from a flat base 21 onto which the feed materials are discharged by a feed duct 22. The materials thus are spread outwardly by engagement with the flat base 21 and engage onto the frustoconical wall 18 so as to turn and move up the wall of the bowl. The base and frustoconical wall are covered by a liner layer 23. The liner layer 23 also engages into the recesses 19 and 20. The recesses 19 and 20 are each of generally rectangular cross section as shown in FIG. 1 but the liner material is shaped so that it becomes thicker toward a base of the recess thus shaping the recess into a generally V shape.

The bowl in the area of the recesses is formed by two annular discs 24 and 25 connected by a cylindrical base wall 26. The liner material indicated at 27 follows the side walls 25 and 24 part way through their depth and then increases in thickness to form the V shape. The liner material extends around the full periphery of the recess but is shown only on one side for convenience of illustration. The base walls 26 of the recesses are spaced from a cylindrical wall 28 of the outer housing so as to provide a space therebetween into which the fluidizing liquid or water can penetrate for injection through the base wall 26 into the interior of the recess.

The base 26 of each recess therefore has a number of discharge ports 29 at angularly spaced positions around the recess as best shown in FIG. 2. These discharge ports are of the general shape shown in the above patent except that the ports do not include injection openings for injection of water into the recess. The ports comprise simply discharge ports with a longitudinal duct which diverges in shape as previously described with a pinch valve at the outer end for controlling the amount of material discharged.

The base also includes a plurality of fluid injection openings 30 which allow the injection of fluidizing water from the supply outside the inner bowl. As shown in FIG. 2, the injection openings are arranged to be inclined relative to a radius of the bowl so as to tend to inject the liquid tangentially around the bowl to effect the fluidizing action on the materials in the recess.

The recesses are modified relative to the above prior patent in that the depth of the recess is significantly increased and in addition a flow guide body 32 is provided in association with each of the discharge ports 29. Each flow guide body is positioned radially inwardly of the respective discharge port so as to see the location spaced inwardly from the port but lying within the recess. Various shapes of guide body can be used in the arrangement the guide body is spherical. Each guide body supported by a support arm 33 extending radially inwardly from the guide body. The support arms are coupled to a ring 34 positioned centrally of the recess that is halfway between the walls 24 and 25 and others in diameter substantially equal to an inside edge of each of the wall 24, 25. The ring 34 thus in effect divides each recess into two separate recesses at the mouth of the recess but the recess is of course open radially outwardly of the ring except for those areas at which the spherical guide body 32 and its support arm are located.

The separation of the materials therefore occurs generally at the mouth of the recesses and between the walls 24, 25 and the ring 34. The separation occurs at an inner surface of the material indicated at 35 in which the heavier materials collect into the recesses between the wall 24 and 25 and either side of the ring 34. The lighter material pass over the collection area defined by the recesses and over the open mouth of the bowl to a collection system schematically indicated at 36. The heavier materials collects within each of the recesses for movement outwardly through the discharge ports 29 for collection of the heavier materials within a collection system schematically indicated at 37.

The ring 34 is supported in the bowl by a longitudinal support strut 38 which connects the ring to one or both of the walls 24, 25. The ring is thus supported in position and of course rotates with the bowl carrying with it the support arms 33 and the guide bodies 32.

The position of the guide bodies immediately forward of the discharge ports acts to support the material radially inward of the guide body to prevent that material from pressing radially outwardly on the discharge port due to the high centrifugal force. It will be appreciated, in the absence of the guide bodies, all the centrifugal force on the material will press the material against the discharge port providing a very high force at that location. The guide body takes away some of that force and transfers the force to the ring 34 while the material can slip around the guide body.

The discharge zone of each discharge port is therefore generally conical with an apex at the discharge port at an axis of the cone extending radially inwardly of the bowl. The cone thus diverges outwardly around the guide body with the angle of the cone being dependent upon the slippage of the material which is related to its repose angle. In addition the material is fluidized by injection of the water through the openings 30 tending to prevent the high centrifugal force on the material from drying the material and thus forming an immovable wedge of material in front of the discharge port.

The depth of the recess is however modified relative to the previous arrangement in that as shown in FIG. 2 the cone of the discharge zone in front of each discharge port diverges so that the cones intersect at the inner surface 35 of the material. In addition the cone is arranged as shown in FIG. 1 so that the cone of the discharge zone extends to a position adjacent the walls 24 and 25. The discharge zone therefore defines a pattern on the inner surface 35 which is substantially circular with those circular discharge patterns overlapping so as to draw material from substantially the whole of the inner surface wherein that the surface overlies the recesses. The separation of the material at the inner surface therefore provides a layer of the heavier material on the inner surface which is then collected and discharged gradually outwardly as the material is discharged from the discharge ports 29.

In one example, therefore, the height of each recess is of the order of 4 inches and the depth of the recesses is of the order of 6 inches and these dimensions are arranged so that they provide approximately the arrangement of the discharge zone as shown.

The shaping of the liner to substantially follow the shape of the discharge cone as shown on the right hand side of FIG. 1 assist in avoiding stationary material being located within the recesses. However the fluidization of the material in the recess by the injection openings 30 provides a gradual migration of the material around the recess to enter the discharge zone of each discharge port, However the main effect of the discharge ports is to collect the material from the inner surface 35 and to gradually move that material outwardly to the discharge port. The guide body 32 assists in increasing the angle of the discharge cone so as to increase the dimension of the discharge pattern at the inner surface.

Figure 3:
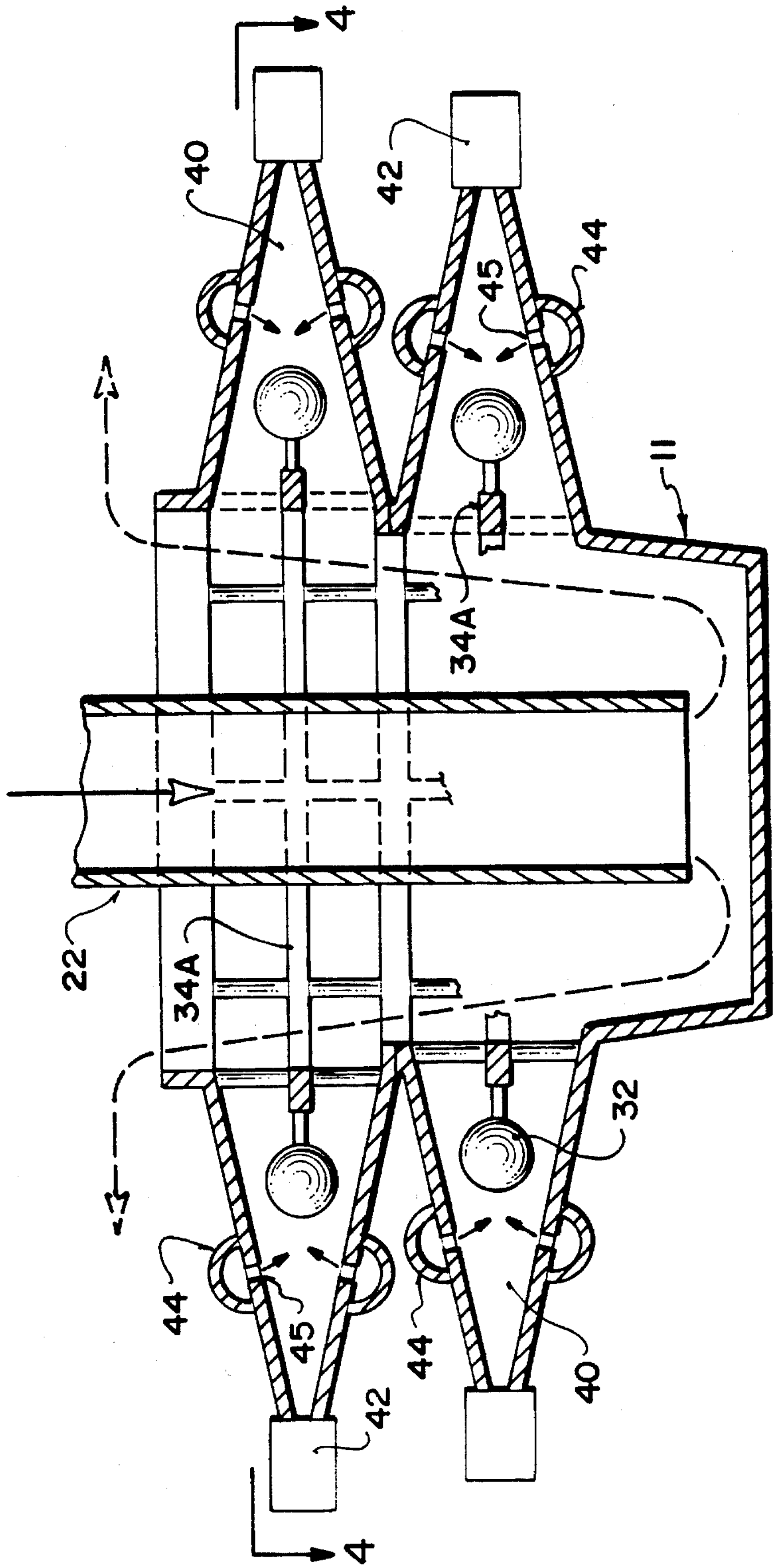
FIG. 3 is a vertical cross sectional view through a second embodiment of centrifugal separator according to the present invention.
Figure 4:
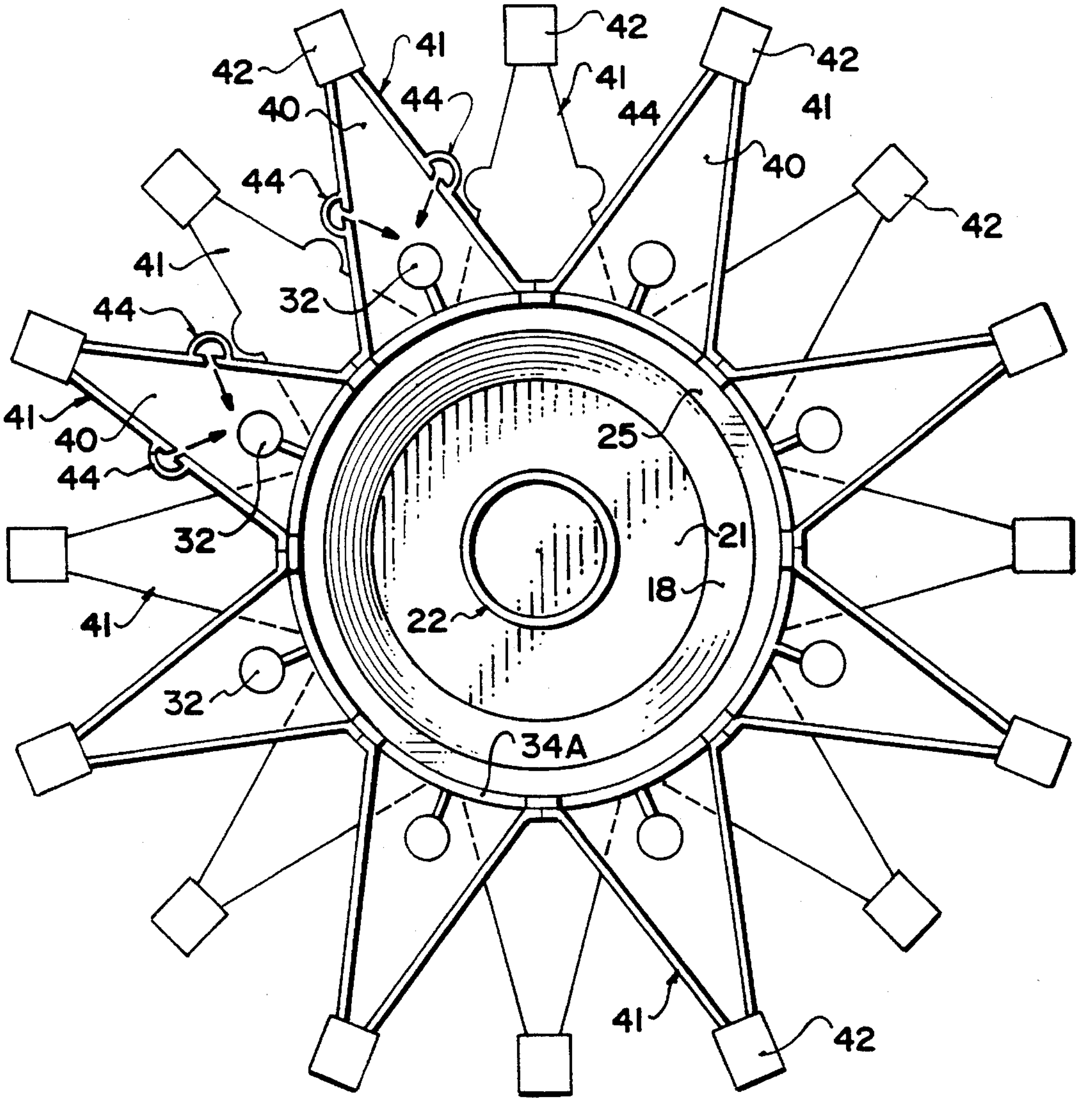
FIG. 4 is a cross sectional view along the lines 4—4 of FIG. 3.

Turning now to FIGS. 3 and 4, there is shown a modified arrangement which operates in a similar manner to that of FIGS. 1 and 2. The embodiment of FIGS. 3 and 4 is however modified in that the two recesses indicated at 40, instead of being annular recesses surrounding the full periphery of the bowl are instead formed as a plurality of conical hoppers indicated at 41. Each hopper has a pinch valve 42 at its apex and diverges from the apex in a cone shape which converts from a cone of circular base gradually to a cone of rectangular base at the ring 34A. The rectangular bases of the cones are shown in FIG. 3 with a rectangular base having a height of the order of 4 inches as previously described and a width equal to the circumference of the bowl at the ring 34A divided by the number of hoppers. In the embodiment shown there are 8 hoppers for each recess. As shown in FIG.

4 the hoppers of the upper recess are angularly offset from the hoppers of the lower recess so that material flowing over the inner surface 35 tends to pass over one or other of the recesses.

The hoppers therefore are shaped generally to follow the conical discharge volume.

Also in FIGS. 3 and 4 the arrangement is modified in that the hoppers are fluidized by the injection of liquid through the wall of the hopper rather than through the apex of the hopper. In this arrangement, therefore, the fluidization is effected by a pipe 44 mounted on each hopper at a position part way therealong with that pipe communicating with openings 45 through the wall of the hopper for injecting water into the interior of the hopper. Preferably the holes 45 are arranged to inject water so that it tends to swirl within the hopper to assist in fluidization. Preferably the holes are arranged so as to inject the water generally toward the guide body 32 so as to assist in fluidizing the material around the sides of the guide body. It will be appreciated that the guide body provides a space around its full periphery so that a cross section of the hopper taken at right angles to the axis of the hopper through the guide body provides an annular space surrounding the guide body through which the material can pass in its fluidized condition. The fluidization of the material within the hopper prevents the material from wedging in the hopper so that there is a reduced requirement to operate the pinch valve with a high frequency since the material is less prone to drying which would otherwise cause wedging in the hopper.

Figure 5:
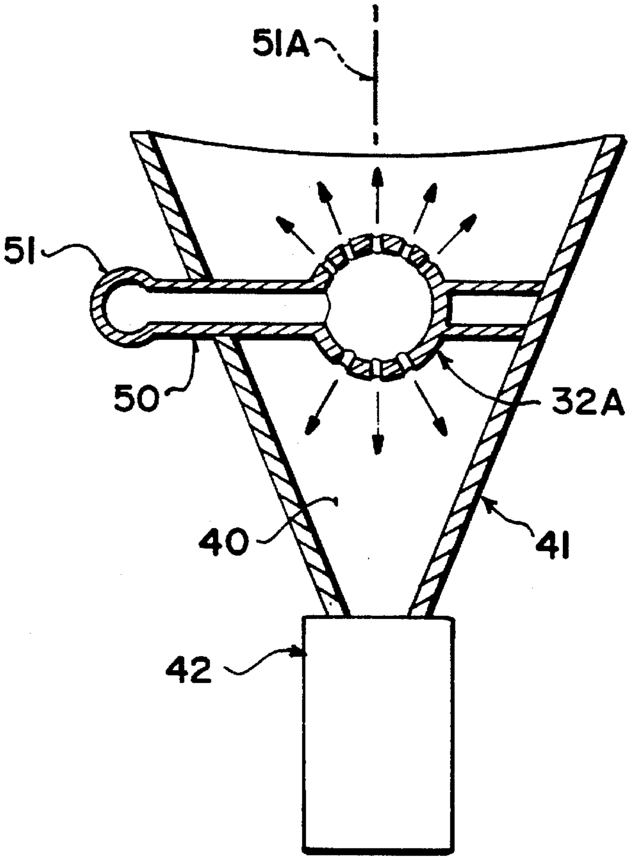
FIG. 5 is a cross sectional view through one hopper of FIG. 3 modified to provide an alternative form of fluidization for the hopper.
Figure 6:
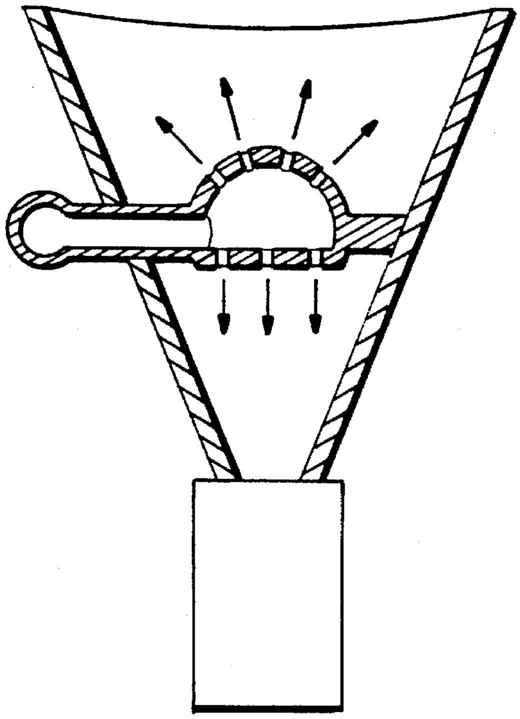
FIG. 6 is a second cross sectional view similar to that of FIG. 5 showing a yet further modified arrangement.

Turning now to FIGS. 5 and 6, there is shown a further modified arrangement in which the fluidization water is injected through the interior of the guide body 32A. In this arrangement the guide body is hollow and connect with a hollow shaft extending at right angles to the axis 51 of the conical hopper. The hollow shaft 50 is connected with a supply duct 51 connected to each of the hoppers. The water therefore passes from the supply duct 51 through the wall of the hopper within the hollow duct 50 to enter the interior of the hollow spherical guide body 32A for injection through openings in the hollow guide body to fluidize the material within the hopper.

In FIG. 6 is shown a similar arrangement in which the guide body of a different shape. In this arrangement the guide body is one half of a sphere with the curved surface projecting away from the discharge port and the flat side of this sphere toward the discharge port. Liquid can be injected through both surfaces to provide fluidization within the full interior of the hopper. Also other shapes of the guide body are possible including diamond shapes with the apex of the diamond lying on the axis 51. Yet further shapes can include the disc lying in a plane at right angles to the axis 51 or a doughnut again lying in a plane at right angles to the axis 51. In each case the body is fed by a hollow pipe so that the injection water passes through the guide body to fluidize the materials within the hopper.

Figure 7:
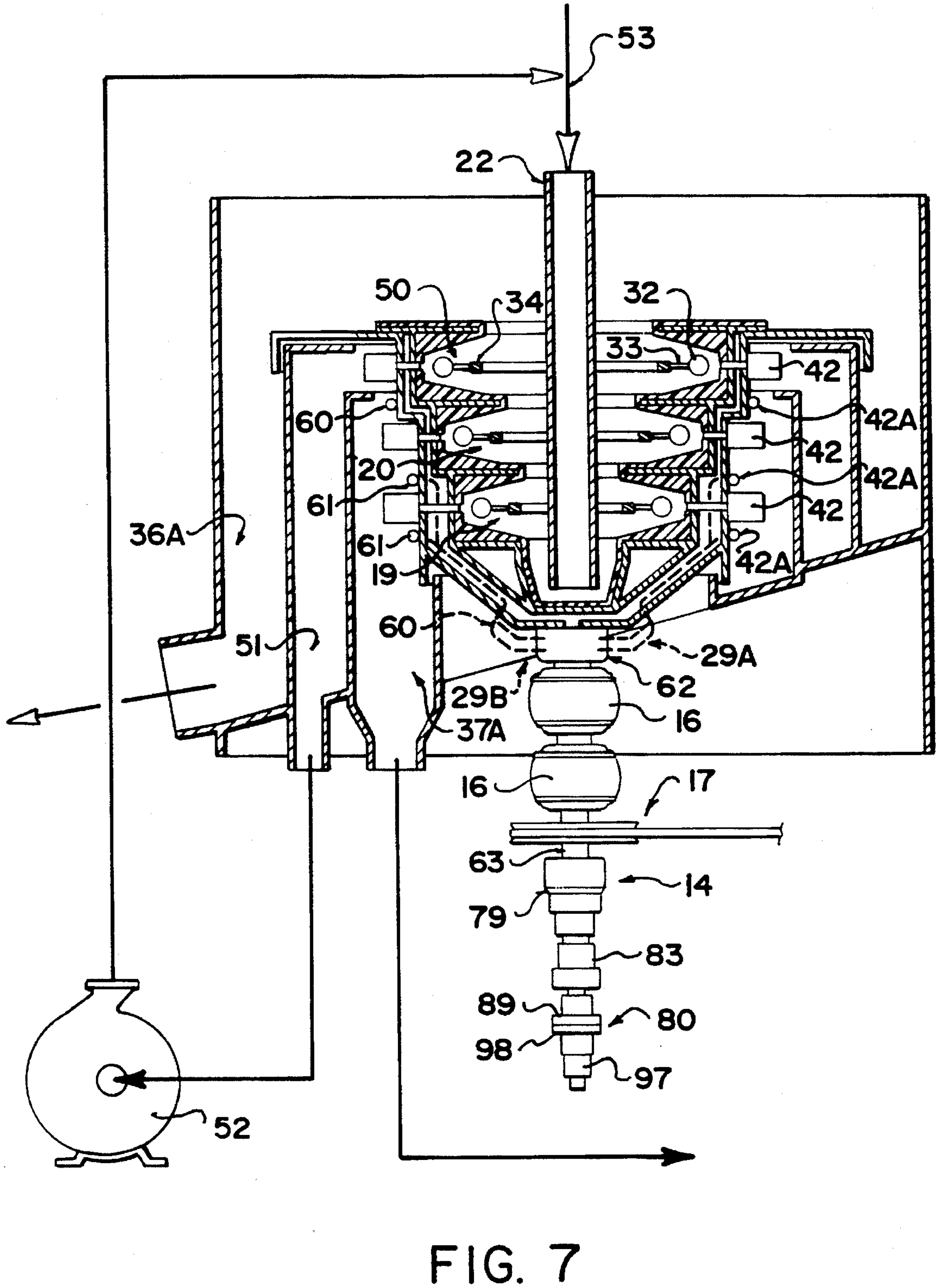
FIG. 7 is a vertical cross-section similar to that of FIG. 1 showing some modifications and additions.

Turning now to FIG. 7, this is modified relative to the cross section shown in FIG. 1 to show further detail of the construction of the housing and launders 36A and the shaft 14. Further, the cross section is modified to show further details of the ducts 29A supplying control air to the pinch valves 42. Thus each row of pinch valves includes a supply duct 42A which communicates actuating air to the respective row of pinch valves and that duct 42A is supplied through the supply ducts 29A from a manifold arrangement 29B provided at the shaft 14.

The arrangement in FIG. 7 is yet further modified by the addition of a third recess 50 downstream of the recesses 19 and 20. The third recess 50 is substantially identical to the first two recesses and is of a slightly increased diameter matching the increase in diameter between the recesses 19 and 20.

As previously described, the material discharged from the recesses 19 and 20 is collected in a launder 37A and the tailings materials discharged over the mouth of the bowl is collected in the launder 36A. In the embodiment shown in FIG. 7 an additional launder 51 is provided which collects the material solely from the recess 50 and supplies this material to a pump 52 which returns the material to the feed 53 entering the feed duct 22.

In this way the third concentrating ring or recess 50 is provided as a scavenger ring. The contents of this ring is continuously discharged through the pinch valves into the launder 51 and is from that launder pumped back into the feed inlet of the machine. The concentrate grade of the scavenger ring is not adequate to discharge into the concentrate stream from the launder 37A but contains some values worth recovering. Thus recirculating the discharge from the recess 50 into the in feed of the machine will move the values from the scavenger ring into one of the two lower rings for later discharge as concentrate.

A yet further modification shown in FIG. 7 relates to the mounting of the support ring 34 which, instead of being mounted by axially extending support elements 38 is instead supported by radially extending support elements 38A which extend from the ring radially outwardly therefrom as shown at 38A in FIG. 2 so as to hold the ring at the required position midway up the recess and centered around the central axis of the bowl. The number of support arms 38A can be selected in accordance with structural requirements but in general there will be four such support arms positioned intermediate the discharge ports and therefore intermediate the guide body 32.

Figure 8:
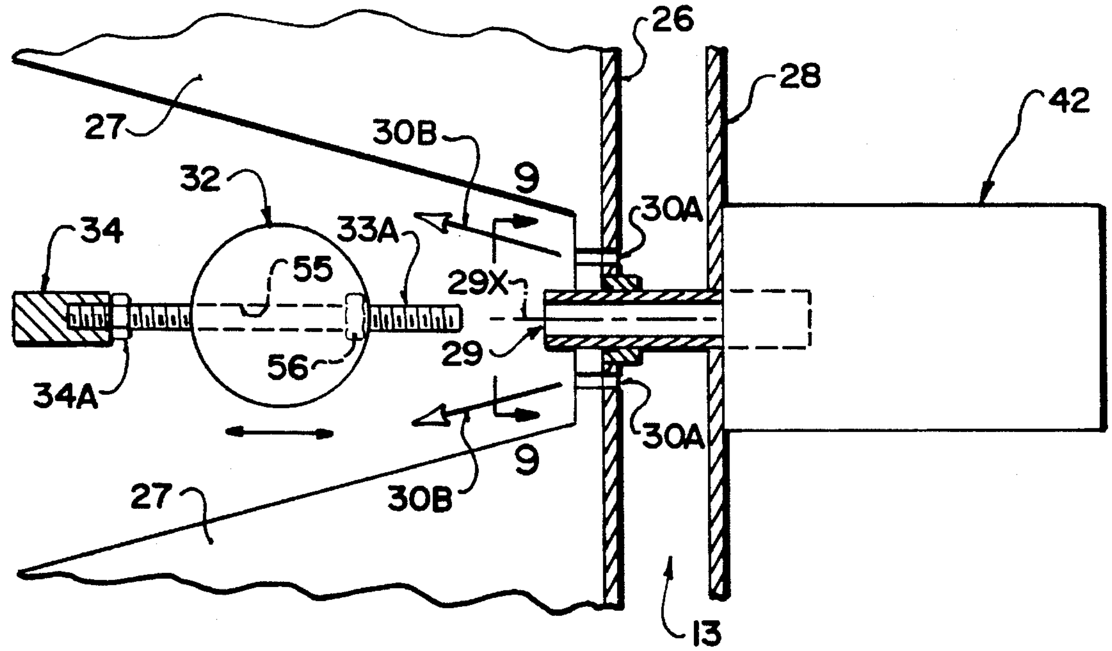
FIG. 8 is a cross-section on an enlarged scale of part only of FIG. 7 showing the mounting of the guide body on the support ring.
Figure 9:
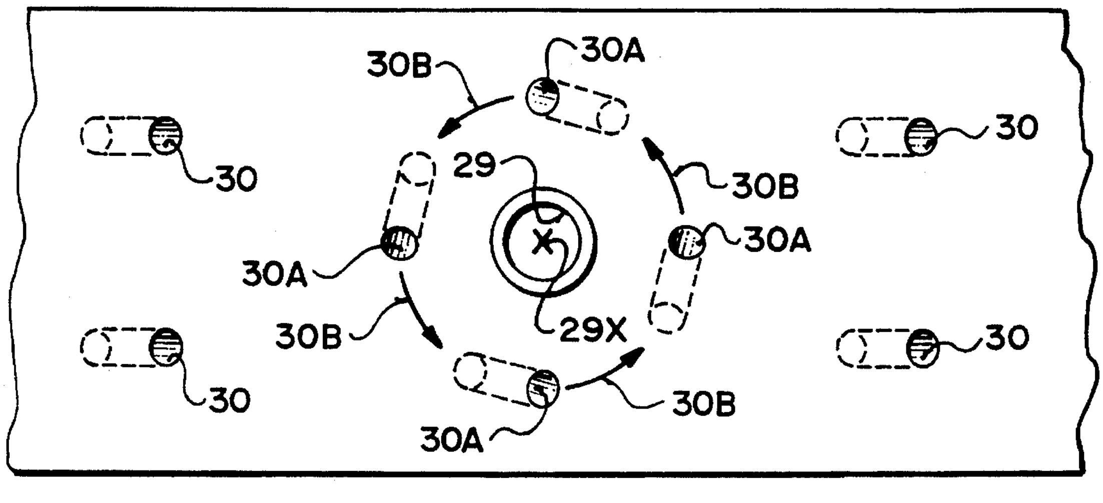
FIG. 9 is a cross-sectional view along the lines 9—9 of FIG. 8.

Turning now to FIGS. 8 and 9, two further modifications are shown. Firstly the guide body 32 has a threaded bore 55 through which support arm 33A passes which has a male thread for cooperation with the threaded bore 55. This allows adjustment of the position of the guide body 32 relative to the support ring 34 by rotation of the guide body on the threaded rod 33A. A lock nut 56 can be used to lock the guide body at the required spacing from the discharge port 29. In this way the spacing of the guide body from the discharge port can be varied in accordance with the requirements which may vary in dependence upon the type of materials to be separated including the particle size, amount of concentrate and the like. For convenience of construction, the threaded rod 33A attaches to the support ring 34 by a nut 34A attached to the ring.

In a second modification, the conventional fluid injection openings 30 are modified by the addition of further fluid injection openings 30A located at each respective discharge port 29. The openings 30A are arranged around the discharge port. The openings 30A are also formed through the base of the recess at an angle to an axis 29X radial to the bowl and extending through the discharge port. Thus the openings 30A lie on a circle surrounding the axis 29X and are inclined to the radial direction 29X and to the circle at the base of the recess so as to inject the fluidizing liquid in a direction 30B which tends to rotate around the axis 29X in a swirling motion. The openings are arranged to direct the liquid in the same direction of rotation. The direction of injection also includes a component which extends from the base of the recess toward the central axis of the bowl as shown in FIG. 8 so that the liquid tends to swirl around the axis 29X while moving toward the center of the bowl thus forming to some extent a vortex surrounding the guide body 32. This assists in fluidizing the material and extending the influence of the discharge port over a wider area to intersect at the inner surface as shown in FIG. 2.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of separating intermixed particulate materials of different specific gravity comprising:

providing a centrifuge bowl having a peripheral wall and an open mouth;

rotating the bowl about a longitudinal axis so as to rotate the peripheral wall around the axis;

feeding the materials to the bowl so as to pass over the peripheral wall and causing a heavier portion of the materials to collect on the peripheral wall while a lighter portion of the materials escapes over the open mouth;

defining in the materials collected on the peripheral wall an inner surface of the materials over which the fed materials pass;

defining on the peripheral wall at least one axially localized area for collecting heavier materials while lighter materials pass over the area for discharge;

defining at the area around the peripheral wall an annular recess spaced radially outwardly of the inner surface;

providing at the area a plurality of angularly spaced discharge ports at an outer surface of the recess, each for allowing materials collecting in the recess to discharge outwardly from the peripheral wall;

collecting the outwardly discharged materials;

and allowing the material discharging from each of the discharge port to form a natural generally conical shape extending in both in angular and axial directions which is substantially free from confinement by walls of the recess with an apex at a respective discharge port and a base of the conical shape at the inner surface, the shape and depth of the recess being arranged relative to the angular spacing of the discharge ports such that the bases at the inner surface of adjacent ones of the conical shapes overlap.

2. The method according to claim 1 including providing for each discharge port a valve which can be opened and closed to control release of the collecting materials and locating the valve radially outwardly of the discharge port such that the discharge port is free from obstruction to the collecting materials.

3. The method according to claim 1 including providing in each conical shape a deflection guide body and supporting the body radially inwardly of the discharge port and radially outwardly of the inner surface.

4. The method according to claim 3 including shaping the body so as to define two angularly spaced sides and two axially spaced sides and including supporting the body so that materials pass on each angularly spaced side of the body and also on each axially spaced side of the body.

5. The method according to claim 3 including shaping the body so as to have a substantially circular shape in a vertical cross-section taken at right angles to a line radial of the axis and passing through the discharge opening.

6. The method according to claim 1 including arranging the annular recess so as to be continuous around the axis of the bowl.

7. The method according to claim 6 including injecting fluidizing liquid into the recess in a direction tending to cause the materials collecting therein to rotate in the recess around the axis of the bowl.

8. A method of separating intermixed particulate materials of different specific gravity comprising:

providing a centrifuge bowl having a peripheral wall and an open mouth;

rotating the bowl about a longitudinal axis so as to rotate the peripheral wall around the axis;

feeding the materials to the bowl so as to pass over the peripheral wall and causing a heavier portion of the materials to collect on the peripheral wall while a lighter portion of the materials escapes over the open mouth;

defining in the materials collected on the peripheral wall an inner surface of the materials over which the fed materials pass;

defining on the peripheral wall at least one axially localized area for collecting heavier materials while lighter materials pass over the area for discharge;

defining at the area around the peripheral wall an annular recess in the peripheral wall spaced radially outwardly of the inner surface;

providing in the recess a plurality of angularly spaced discharge ports at an outer surface of the recess, each for allowing materials collecting in the recess to discharge outwardly from the peripheral wall;

collecting the outwardly discharged materials;

including providing for each discharge port a deflection guide body and supporting the body within the recess spaced radially inwardly of the discharge port and outwardly of the inner surface;

shaping the body so as to define two angularly spaced sides and two axially spaced sides and including supporting the body so that materials in the recess pass on each angularly spaced side of the body and also on each axially spaced side of the body.

9. The method according to claim 8 including providing for each discharge port a valve which can be opened-and closed to control release of the collecting materials and locating the valve radially outwardly of the discharge port such that the discharge port is free from obstruction to the collecting materials.

10. The method according to claim 8 including shaping the body so as to have a substantially circular shape in a vertical cross-section taken at right angles to a line radial of the axis and passing through the discharge opening.

11. The method according to claim 8 including arranging the annular recess so as to be continuous around the axis of the bowl.

12. The method according to claim 11 including injecting fluidizing liquid into the recess in a direction tending to cause the materials collecting therein to rotate in the recess around the axis of the bowl.

13. A method of separating intermixed particulate materials of different specific gravity comprising:

providing a centrifuge bowl having a peripheral wall and an open mouth;

rotating the bowl about a longitudinal axis so as to rotate the peripheral wall around the axis;

providing a feed material of intermixed particulate materials of different specific gravity and feeding the feed material to the bowl so as to pass over the peripheral wall and to cause a heavier portion of the materials to collect on the peripheral wall while a remaining lighter portion of the feed material escapes from the open mouth;

defining on the peripheral wall for rotation therewith at least one first axially localized, annular recess extending radially outwardly from the peripheral wall for collecting said heavier materials while said lighter materials pass over the first recess;

defining on the peripheral wall for rotation therewith at least one second axially localized, annular recess extending radially outwardly from the peripheral wall for collecting said heavier materials while said lighter materials pass over the second recess, the second recess being downstream of the first recess to receive materials passing therefrom and such that the lighter materials from the second recess pass toward said open mouth for discharge;

providing at the first and second recesses discharge means at an outer surface of the recesses, each for causing materials collecting in the recess to discharge outwardly from the peripheral wall under centrifugal forces generated by the rotation of the bowl;

collecting the outwardly discharged materials from the first recess;

collecting the outwardly discharged materials from the second recess separately from the materials from the first recess;

and returning the materials from the second recess to the feed material.

14. The method according to claim 13 including providing the discharge means as a plurality of angularly spaced discharge ports.

15. The method according to claim 14 including for each discharge port providing a deflection guide body engaging and guiding materials moving toward the discharge port and supporting the body radially inwardly of the discharge port and radially outwardly of an inner surface of the materials.

16. The method according to claim 15 including shaping the body so as to define two angularly spaced sides and two axially spaced sides and including supporting the body so that materials pass on each angularly spaced side of the body and also on each axially spaced side of the body.

17. The method according to claim 16 including shaping the body so as to have a substantially circular shape in a vertical cross-section taken at right angles to a line radial of the axis and passing through the discharge opening.

18. The method according to claim 14 including providing for each discharge port a valve which can be opened and closed to control release of the collecting materials and locating the valve radially outwardly of the discharge port such that the discharge port is free from obstruction to the collecting materials.

19. The method according to claim 13 including arranging the annular recess so as to be continuous around the axis of the bowl.

20. The method according to claim 19 including injecting fluidizing liquid into the recess in a direction tending to cause the materials collecting therein to rotate in the recess around the axis of the bowl.

* * * * *